(12) United States Patent
Sassa et al.

(10) Patent No.: US 10,637,317 B2
(45) Date of Patent: Apr. 28, 2020

(54) ELECTROMAGNETIC ACTUATOR

(71) Applicant: DENSO CORPORATION, Kariya, Aichi-pref. (JP)

(72) Inventors: Kazuya Sassa, Kariya (JP); Naofumi Adachi, Kariya (JP); Shingo Kitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 15/595,146

(22) Filed: May 15, 2017

(65) Prior Publication Data

US 2018/0115210 A1 Apr. 26, 2018

(30) Foreign Application Priority Data

Oct. 21, 2016 (JP) .................. 2016-207040

(51) Int. Cl.
*H02K 3/30* (2006.01)
*H01F 7/16* (2006.01)
*H02K 1/34* (2006.01)
*H02K 3/28* (2006.01)
*H02K 33/02* (2006.01)

(52) U.S. Cl.
CPC ............. *H02K 3/30* (2013.01); *H01F 7/1638* (2013.01); *H02K 1/34* (2013.01); *H02K 3/28* (2013.01); *H02K 33/02* (2013.01); *H01F 2007/1676* (2013.01)

(58) Field of Classification Search
CPC ...... H01F 7/081; H01F 7/1607; H01F 7/1638; H01F 7/1623; H01F 7/127; H01F 41/24; F16K 31/06; F16K 31/061; F16K 31/0613; F16K 31/062; F16K 31/0624; F02M 47/027; F02M 51/00; F02M 61/166; F02M 61/167; F02M 61/168; F02M 63/0015; F02M 63/0017; F02M 63/0024; F02M 63/004; F02M 63/0225; H02K 33/02; H02K 3/28; H02K 3/30; H02K 1/34;
(Continued)

(56) References Cited

U.S. PATENT DOCUMENTS 5,156,341 A * 10/1992 Terakado ........... F02M 51/0675
239/585.4
6,601,822 B2 * 8/2003 Tachibana ........... F16K 31/0613
137/625.69
(Continued)

FOREIGN PATENT DOCUMENTS

DE 10235240 A1 2/2004
JP 56088305 * 7/1981 ........... H01F 7/1607
JP 2016-014416 A 1/2016

*Primary Examiner* — Tran N Nguyen

(57) ABSTRACT

The present disclosure provides an electromagnetic actuator that drives an armature by an electromagnetic force. The electromagnetic actuator includes a stator, a coil, and an insulator. The stator is formed of a magnetic material and has a cylindrical portion. The coil is disposed outside of the stator. The coil generates a magnetic field when being energized. The insulator is disposed in a particular region of the stator facing the coil in a radial direction. The insulator extends partially along the stator in a circumferential direction and suppresses a current flowing through the stator in the circumferential direction. The stator is continuously formed entirely along the circumferential direction by the magnetic material.

10 Claims, 7 Drawing Sheets

(58) Field of Classification Search
CPC ...... C23C 18/32; G05D 16/20; G05D 16/202; G05D 16/2024
See application file for complete search history.

(56) References Cited

U.S. PATENT DOCUMENTS

| | | | |
|---|---|---|---|
| 2002/0020769 A1* | 2/2002 | Adachi | F02M 47/027 239/585.1 |
| 2004/0114303 A1* | 6/2004 | Kawamura | F16K 31/0613 361/296 |
| 2007/0052508 A1 | 3/2007 | Tanaka | |

* cited by examiner

ELECTROMAGNETIC ACTUATOR

CROSS REFERENCE TO RELATED APPLICATION

This application is based on reference Japanese Patent Application No. 2016-207040 filed on Oct. 21, 2016, the disclosure of which is incorporated herein by reference.

TECHNICAL FIELD

The present disclosure relates to an electromagnetic actuator that drives an armature by an electromagnetic force.

BACKGROUND

Conventionally, the electromagnetic actuator includes a coil that generates a magnetic field upon energization. An inner stator is disposed inside the coil, and an eddy current is generated on a side of the inner stator close to the coil upon energization. A magnetic field is generated by the eddy current, which may cancel the magnetic field generated by the coil. As a result, the magnetic field by the eddy current may interfere with operation of the armature.

For example, Patent Literature (DE 10235240 A) discloses a method for suppressing occurrence of the eddy current. More specifically, Patent Literature discloses a slit extending along the axial direction over the entire region of the magnetic material. Thus, the magnetic material is entirely split by the slit. Since a current is shut off by the slit, occurrence of the eddy current may be suppressed.

As described above, the slit of Patent Literature, which completely splits the magnetic material, is formed only one. Therefore, it would be difficult to obtain sufficient effects of suppressing the eddy current from the single slit. If two or more slits are formed in the stator, the stator is split into a plurality of parts, which may additionally require a complex structure to hold the stator.

In view of the above, it is an objective of the present disclosure to provide an electromagnetic actuator that is capable of suppressing occurrence of an eddy current with a simple structure.

SUMMARY

An aspect of the present disclosure provides an electromagnetic actuator that drives an armature by an electromagnetic force. The electromagnetic actuator includes a stator, a coil, and an insulator. The stator is formed of a magnetic material and has a cylindrical portion. The coil is disposed outside of the stator.

The coil generates a magnetic field when being energized. The insulator is disposed in a particular region of the stator facing the coil in a radial direction. The insulator extends partially along the stator in a circumferential direction and suppresses a current flowing through the stator in the circumferential direction. The stator is continuously formed entirely along the circumferential direction by the magnetic material.

According to the above-described aspect, the insulator is formed partially in the particular region of the stator that faces the coil in the radial direction. Due to the existence of the insulator, an eddy current flowing through the stator in the circumferential direction can be suppressed. The stator is continuously formed entirely along the circumferential direction by the magnetic material. In other words, the stator is not completely split into a plurality of parts by the partially formed insulator. Thus, an eddy current generated in the stator when being energized can be surely suppressed.

In this way, it is possible to suppress occurrence of the eddy current by simply forming the insulator in the stator. As a result, it is possible to provide the electromagnetic actuator that drives the armature by a magnetic field generated in the coil while suppressing negative effects due to an eddy current which may cancel the magnetic field in the coil.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

It is needless to say that following embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Figure 1:
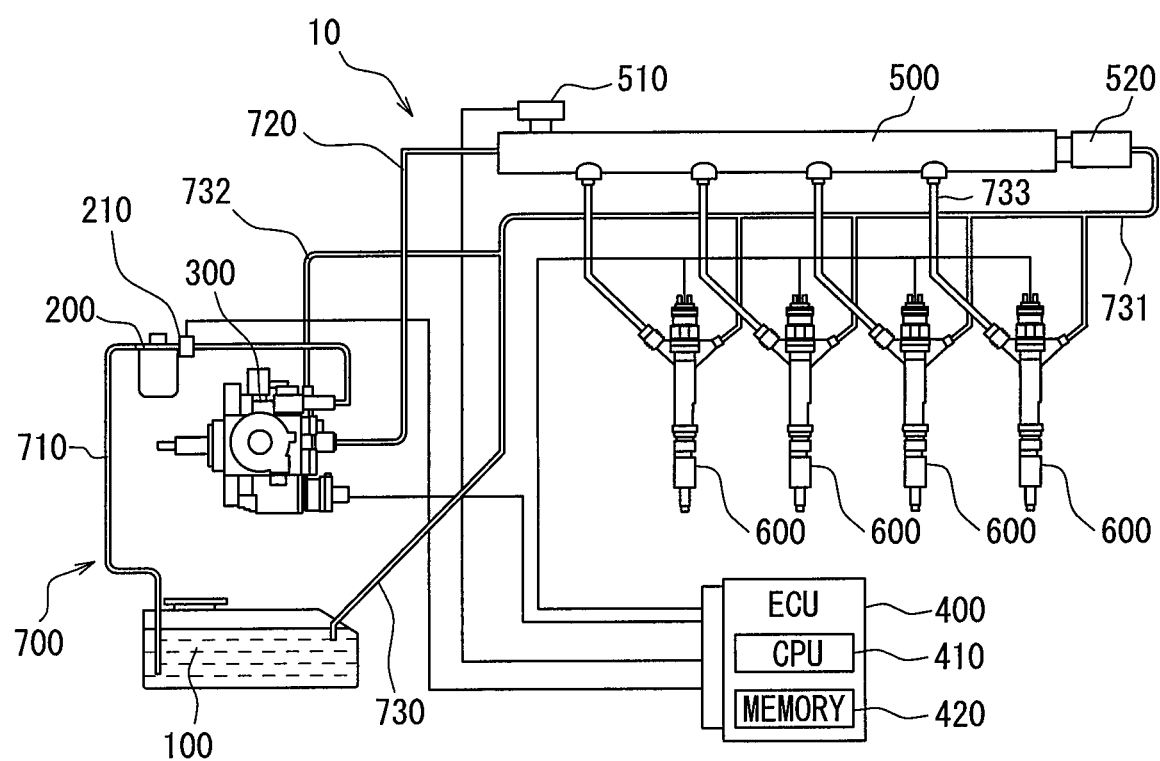
FIG. 1 is a schematic view of a fuel system.

With reference to FIGS. 1 to 9, a first embodiment will be described below. As shown in FIG. 1, a fuel supply system 10 according to the first embodiment is a fuel supply system used for a diesel engine. The fuel supply system 10 includes a fuel tank 100, a fuel filter 200, a supply pump 300, an ECU 400, a common rail 500, and fuel injection valves 600.

The fuel tank 100 is a tank storing a fuel to be supplied to an internal combustion engine. The fuel tank 100 is connected to a supply pump 300 through a pipe 700 for the fuel. The fuel stored in the fuel tank 100 is pumped up by the supply pump 300. The supply pump 300 pumps up the fuel from the fuel tank 100 and supplies the fuel to the common rail 500. An excess fuel (a main return fuel) in the fuel injection valves 600 and the common rail 500 and a fuel (a pump return fuel) from the supply pump 300 are returned to the fuel tank 100 as a return fuel through the pipe 700.

The pipe 700 includes a low pressure pipe 710, a high pressure pipe 720, a return pipe 730, and a return pipe 730. The low pressure pipe 710 is a pipe located between the fuel tank 100 and the supply pump 300. The high pressure pipe 720 is a pipe located between the supply pump 300 and the common rail 500.

The return pipe 730 is a pipe for fuel located between the internal combustion engine and the fuel tank 100. The return pipe 730 includes a main return pipe 731 and a pump return pipe 732. The main return pipe 731 is a pipe through which the main return fuel from the fuel injection valve 600 and the common rail 500 flows back to the fuel tank 100. The pump return pipe 732 is a pipe through which the pump return fuel from the supply pump 300 flows back to the fuel tank 100. The return pipe 730 reruns the main return fuel and the pump return fuel from the main return pipe 731 and the pump return pipe 732, respectively, to the fuel tank 100.

The fuel filter 200 is disposed in the low pressure pipe 710 between the fuel tank 100 and the supply pump 300. The fuel filter 200 removes foreign substances in the fuel by filtering the fuel when the fuel passes through the fuel filter 200. A clogging switch 210 electrically connected to the ECU 400 is disposed in the fuel filter 200 on a fuel exiting side of the fuel filter.

The clogging switch 210 includes an elastic member deformable under a specified pressure, a switch member pressed by an elastic force of the elastic member, and a contact member in contact with the switch member pressed by the elastic member. The clogging switch 210 outputs an ON signal to the ECU 400 when the contact member is in contact with the switch member and an OFF signal to the ECU 400 when the contact member is not in contact with the switch member.

That is, the clogging switch 210 outputs the ON signal during a normal operation. On the contrary, when a pressure of the fuel at a fuel exiting side of the fuel filter 200 is less than a specified pressure due to clogging of the fuel filter 200, the switch member moves away from the contact member.

More specifically, when a pressure between the supply pump 300 and the fuel filter 200 becomes negative, the elastic member is drawn toward the pipe 700, and then the switch member, which was pressed by the elastic member, moves away from the contact member. Accordingly, the clogging switch 210 outputs the OFF signal to the ECU 400. That is, the clogging switch 210 is a so-called normally-closed type switch that normally outputs the ON signal and outputs the OFF signal only when a pressure is decreased due to clogging. The ECU 400 detects clogging of the fuel filter 200 when receiving the OFF signal from the clogging switch 210. That is, the clogging switch 210 and the ECU 400 may serve as a clogging detector.

Each of the fuel injection valves 600 has a cylindrical shape and is disposed in a respective cylinder of the internal combustion engine. The fuel injection valve 600 is connected to the common rail 500 and fuel is supplied to the fuel injection valve 600 from the common rail 500. The fuel injection valve 600 is electrically connected to the ECU 400, and injects fuel to the corresponding cylinder in response to commands from the ECU 400. The fuel injection valve 600 is connected to the fuel tank 100 through the main return pipe 731. Fuel, which was supplied to the fuel injection valve 600 from the common rail 500 but has not been injected into the cylinder, is returned to the fuel tank 100 as the main return fuel through the main return pipe 731.

The common rail 500 has a cylindrical shape with a space therein. The common rail 500 is connected to the supply pump 300 through the high pressure pipe 720 between the common rail 500 and the supply pump 300. The common rail 500 supplies the fuel to the fuel injection valves 600 while storing the fuel from the supply pump 300 through the high pressure pump 720. The common rail 500 includes a pressure sensor 510 and a pressure limiter 520. The pressure sensor 510 detects a pressure of the fuel in the common rail 500 and outputs the detected pressure to the ECU 400.

The pressure limiter 520 includes a valve having therein an elastic body. The pressure limiter 520 is connected to the fuel tank 100 through a conduit. The valve of the pressure limiter 520 is normally closed by a biasing force generated from the elastic nature of the elastic body. Conversely, the valve of the pressure limiter 520 is opened when the pressure in the common rail 500 is greater than the biasing force of the elastic body and the elastic body is deformed by the pressure. Accordingly, the common rail 500 and the fuel tank 100 are connected to each other through the main return pipe 731 connected to the pressure limiter 520. The pressure limiter 520 prevents the pressure in the common rail 500 from exceeding a specified pressure by discharging the fuel from the common rail 500 to the fuel tank 100 to decrease the pressure in the common rail 500.

The ECU 400 includes a CPU 410 that executes a variety of calculations and a memory 420 that stores therein data generated during the calculations, calculation results, and programs that have been designed in advance. The ECU 400 is electrically connected to the fuel injection valves 600, the supply pump 300, the clogging switch 210, and the pressure sensor 510. The ECU 400 calculates commands for an amount of fuel to be pumped up by, and discharged from, the supply pump 300, by executing arithmetic processing of the pressures received from the pressure sensor 510. The ECU 400 outputs the calculated commands to the supply pump 300. Accordingly, the ECU 400 controls an amount of fuel to be supplied to the common rail 500 and a pressure of fuel injected into the cylinder by each of the fuel injection valves 600. Furthermore, the ECU 400 controls an amount of fuel to be actually injected from each of the fuel injection valves 600 by outputting commands about an amount of the fuel to each of the fuel injection valves 600. The ECU 400 detects occurrence of clogging at the fuel filter 200 when receiving the OFF signal from the clogged switch 210. The memory 420 stores a correlation map in advance. This correlation map is a map, which has been prepared through experimentations, representing a correlation between a temperature of fuel and a time necessary to dissolve waxing of the fuel. The ECU 400 sets, based on the correlation map, an intervening period during which the detection of clogging at the fuel filter 200 is prohibited.

Next, the specific structures of the fuel injection valve 600 will be described with reference to FIG. 2. A fuel pipe 733 and the main return pipe 731 are connected to each of the fuel injection valves 600. Each of the fuel injection valves 600 is attached to a head member that defines therein the combustion chamber. Each of the fuel injection valves 600 is inserted into a through hole formed in the head member. The fuel injection valve 600 directly injects a fuel, which was supplied through the fuel pipe 733, into the combustion chamber through a plurality of injection holes 44. The fuel injection valve 600 includes a valve mechanism to control a fuel injection through the injection holes 44. The injection mechanism includes a pressure control valve 35 and a main valve 50. The pressure control valve 35 operates according to control signals from the ECU 400. The main valve 50 selectively closes and opens the injection holes 44.

Figure 2:
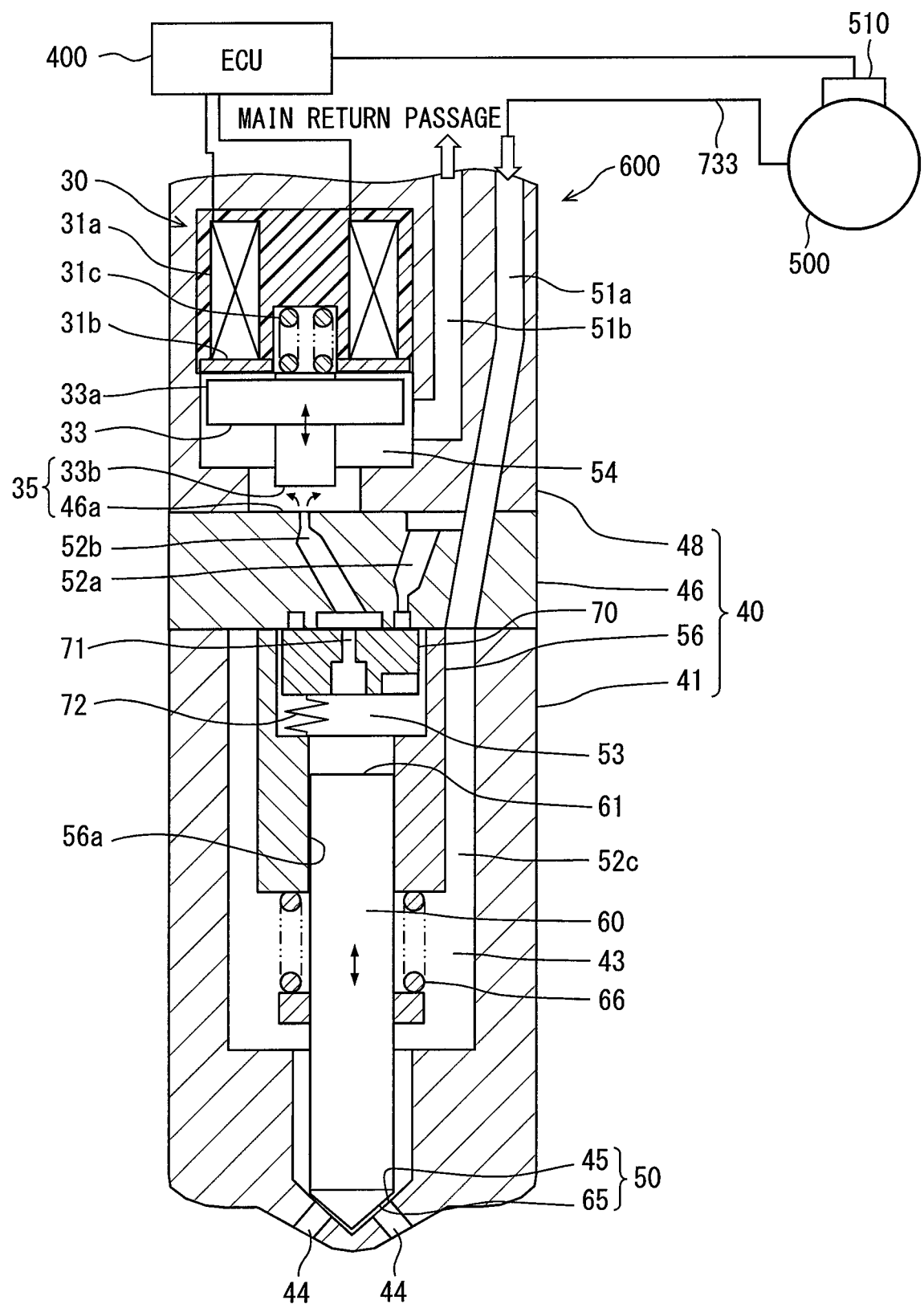
FIG. 2 is a cross-sectional view of a fuel injection valve.

FIG. 2 shows a cross-section schematically illustrating one of the fuel injection valves 600. The fuel injection valve 600 includes a control body 40, a nozzle needle 60, an armature 33, a driving portion 30, a return spring 66, and a floating plate 70. The injection holes 44, a high pressure fuel passage 51$a$, an inflow passage 52$a$, an outflow passage 52$b$, a supply passage 52$c$, a pressure control chamber 53, an armature chamber 54, and a low pressure fuel passage 51$b$ are formed in the control body 40.

The control body 40 is inserted into the combustion chamber in an insertion direction, and the injection holes 44 are formed at a tip end of the control body 40 in the insertion direction, as shown in FIG. 2. The tip end has a conical or hemispherical shape. The injection holes 44 are formed in the control body 40 to extend in such directions that the injection holes gradually separate away from each other from an inside toward an outside of the control body 40. The high pressured fuel is injected into the combustion chamber through the injection holes 44. The fuel is vaporized while passing through the fuel injection holes 44, whereby the vapored fuel is changed into a state where the fuel can be easily mixed with air.

The high pressure fuel passage 51a is connected to the fuel pipe 733. The high pressure fuel passage 51a guides a high pressure fuel supplied from the common rail 500 into the inflow passage 52a and the supply passage 52c. The high pressure fuel passage 51a and the supply passage 52c are in fluid communication with each other through the inflow passage 52a. The inflow passage 52a guides a high pressured fuel into the pressure control chamber 53. The pressure control chamber 53 and the armature chamber 54 are in fluid communication with each other through the outflow passage 52b. The outflow passage 52b guides a fuel in the pressure control chamber 53 to the armature chamber 54. The supply passage 52c guides a high pressured fuel supplied through the high pressure fuel passage 51a to the injection holes 44.

The pressure control chamber 53 is positioned in the control body 40 at one side of the nozzle needle 60 opposite to the injection holes 44. A high pressured fuel supplied through the fuel pipe 733 and the inflow passage 52a flows into the pressure control chamber 53. The pressure of the fuel in the pressure control chamber 53 varies depending on an inflow of the high pressured fuel from the inflow passage 52a and an outflow of the fuel to the armature chamber 54 through the outflow passage 52b. The nozzle needle 60 reciprocates inside the pressure chamber 53 using the pressure variations.

The fuel flows into the armature chamber 54 from the pressure control chamber 53 through the outflow passage 52b. The armature 33 is reciprocatably housed in the armature chamber 54. The pressure of the fuel in the armature chamber 54 is less than the pressure of the fuel in the pressure control chamber 53.

The low pressure fuel passage 51b is connected to the armature chamber 54 and the main return pipe 731. The low pressure fuel passage 51b extends along the high pressure fuel passage 51a in the control body 40. The low pressure fuel passage 51b discharges the fuel in the armature chamber 54 to the main return pipe 731.

The control body 40 includes a nozzle body 41 formed of a metal, a cylinder 56, an orifice plate 46, and a holder 48. The nozzle body 41, the orifice plate 46, and the holder 48 are arranged in this order from the tip end of the fuel injection valve 600.

The nozzle body 41 has a cylindrical shape with a bottom portion. The injection holes 44 and the supply passage 52c are formed in the nozzle body 41.

The nozzle body 41 includes a nozzle needle chamber 43 and a seat portion 45. The nozzle needle chamber 43 is a cylindrical hole and houses the nozzle needle 60 and the cylinder 56. The supply passage 52c is defined in the nozzle needle chamber 43 by the cylinder 56. The seat portion 45 has a conical shape in the tip end and faces the supply passage 52c.

The cylinder 56 has a cylindrical shape. The cylinder 56 defines the pressure control chamber 53 together with the orifice plate 46 and the nozzle needle 60. The cylinder 56 is arranged coaxially with the nozzle body 41 circumferentially inside the nozzle body 41.

The orifice plate 46 has a disk shape. The inflow passage 52a and the outflow passage 52b are formed in the orifice plate 46. The orifice plate 46 includes a control seat portion 46a. The control seat portion 46a is a portion of a top surface of the orifice plate 46 facing the holder 48, which surrounds the opening of the outflow passage 52b. The control seat portion 46a constitutes the pressure control valve 35 together with the armature 33.

The holder 48 has a cylindrical shape. Two vertical holes extending along an axial direction of the holder 48 are formed in the holder 48. The two vertical holes are serve as the high pressure fuel passage 51a and the low pressure fuel passage 51b, respectively. The driving portion 30 is housed in the holder 48.

The nozzle needle 60 is formed of a metal and has a columnar shape as a whole. The nozzle needle 60 is housed in the nozzle body 41. One end of the nozzle needle 60 is inserted into the cylinder 56. The nozzle needle 60 is reciprocatable along a support surface 56a formed on an inner wall of the cylinder 56.

The nozzle needle 60 includes a receiving surface 61 and a face surface 65. The nozzle needle 60 reciprocates along the axial direction of the nozzle body 41 according to variations of a pressure of fuel in the pressure control chamber 53 applied to the receiving surface 61, whereby the face portion 65 seats on and separates from the seat portion 45. The face portion 65 constitutes the main valve 50, which selectively opens and closes the injection holes 44, together with the seat portion 45. When the face portion 65 is separated from the seat portion 45, the injection holes 44 are opened and fuel injection is started. When the face portion 65 rests on the seat portion 45, the injection holes 44 are closed and fuel injection is stopped.

The armature 33 is housed in the armature chamber 54 and is reciprocatable inside the armature chamber 54. The armature 33 is made of a ferromagnetic metal and is formed by arranging two columnar bodies along its axial direction. The armature 33 varies a pressure in the pressure control chamber 53 by controlling an outflow of the fuel from the pressure control chamber 53 to the armature chamber 54. The armature 33 includes an attraction portion 33a and a control face portion 33b. The attraction portion 33a is formed into a disk shape. The attraction portion 33a is attracted toward the driving portion 30 by an electromagnetic force generated by the driving portion 30. The control face portion 33b is an end surface of a columnar portion of the armature 33 that protrudes from the center area of the attraction portion 33a toward the opening of the outflow passage 52b. The control face portion 33b is pressed against the control seat portion 46a in accordance with movement of the armature 33 and closes the opening of the outflow passage 52b that is open in the armature chamber 54.

The driving portion 30 is an electromagnetic actuator and drives the armature 33 using an electromagnetic force. The driving portion 30 is arranged above the armature 33. The driving portion 30 includes a solenoid 31a, a magnetic pole plate 31b, and a spring 31c. The solenoid 31a receives a driving signal having a pulse waveform from the ECU 400. The solenoid 31a generates an electromagnetic field when receiving the driving signal. The magnetic pole plate 31b is made of a magnetic material and has a disk shape. The magnetic pole plate 31b faces the attraction portion 33a. The magnetic pole plate 31b is magnetized and attracts the attraction portion 33a by a magnetic force. The spring 31c is a coil spring formed of a metallic wire wound in a spiral form. The spring 31c biases the armature 33 in a direction away from the magnetic pole plate 31b.

The driving portion 30 causes the control face portion 33b to rest on the control seat portion 46a by a biasing force of the spring 31c when the driving portion 30 is not energized by the ECU 400. Therefore, the pressure control valve 35 is in a closed state where fluid communication between the pressure control chamber 53 and the armature chamber 54 as the fuel outflow chamber is blocked.

On the contrary, when the driving portion 30 is energized by the ECU 400, the driving portion 30 causes the control face 33b to separate away from the control seat portion 46a by attracting the armature 33. Thus, the pressure control valve 35 is in an open state where fluid communication between the pressure control chamber 53 and the armature chamber 54 is established. As described above, the driving portion 30 controls the pressure control valve 35 to selectively open and close by controlling the armature 33 to reciprocate by the ECU 400. As a result, an outflow of the fuel in the pressure control chamber 53 to the armature 54 is controlled by the pressure control valve 35.

The return spring 66 is a coil spring formed of a metallic wire wound in a spiral form. The return spring 66 biases the nozzle needle 60 toward the injection holes 44 to have the face portion 65 rest on the seat portion 45.

The floating plate 70 is a movable plate and is housed in the pressure control chamber 53. The floating plate 70 switches between a state where the high pressure fuel passage 51a is in fluid communication with the pressure control chamber 53 and a state where the high pressure fuel passage 51a is not in fluid communication with the pressure control chamber 53. An out orifice 71 is formed in the floating plate 70 and the inflow passage 52b is in fluid communication with the pressure control chamber 53 through the out orifice 71. The floating plate 70 is made of a metal and has a disk shape. The floating plate 70 is reciprocatably housed in the pressure control chamber 53 in the axial direction of the nozzle body 41. The floating plate 70 is biased by a plate spring 72 toward the orifice plate 46. The out orifice 71 is formed in the floating plate 70. The out orifice 71 is a through hole passing through the floating plate 70 in a thickness direction thereof. A sectional area of a flow passage of the out orifice 71 is smaller than that of the outflow passage 52b. When the floating plate 70 is in tightly contact with the orifice plate 46, the out orifice 71 allows fuel to flow out of the pressure control chamber 53 toward the outflow passage 52b while regulating an amount of the outflow of the fuel into the outflow passage 52b.

As described above, in the fuel injection valve 600, a fuel in the pressure control chamber 53 flows toward the armature chamber 54 through the out orifice 71 and the outflow passage 52b when the pressure control valve 35 is opened. As a result, a pressure of the fuel in the pressure control chamber 53 decreases, and the nozzle needle 60 moves toward the pressure control chamber 53 causing the injection holes 44 to open. Then, when the fluid communication between the pressure control chamber 53 and the armature chamber 54 is shut off by the pressure control valve 35 being closed, the fuel supplied through the inflow passage 52a flows into the pressure control chamber 53 while pressing downward the floating plate 70 against the biasing force of the plate spring 72. As a result, the pressure of the fuel in the pressure control chamber 53 is increased again, and the nozzle needle 60 swiftly moves toward the seat portion 45 to close the injection holes 44.

Figure 3:
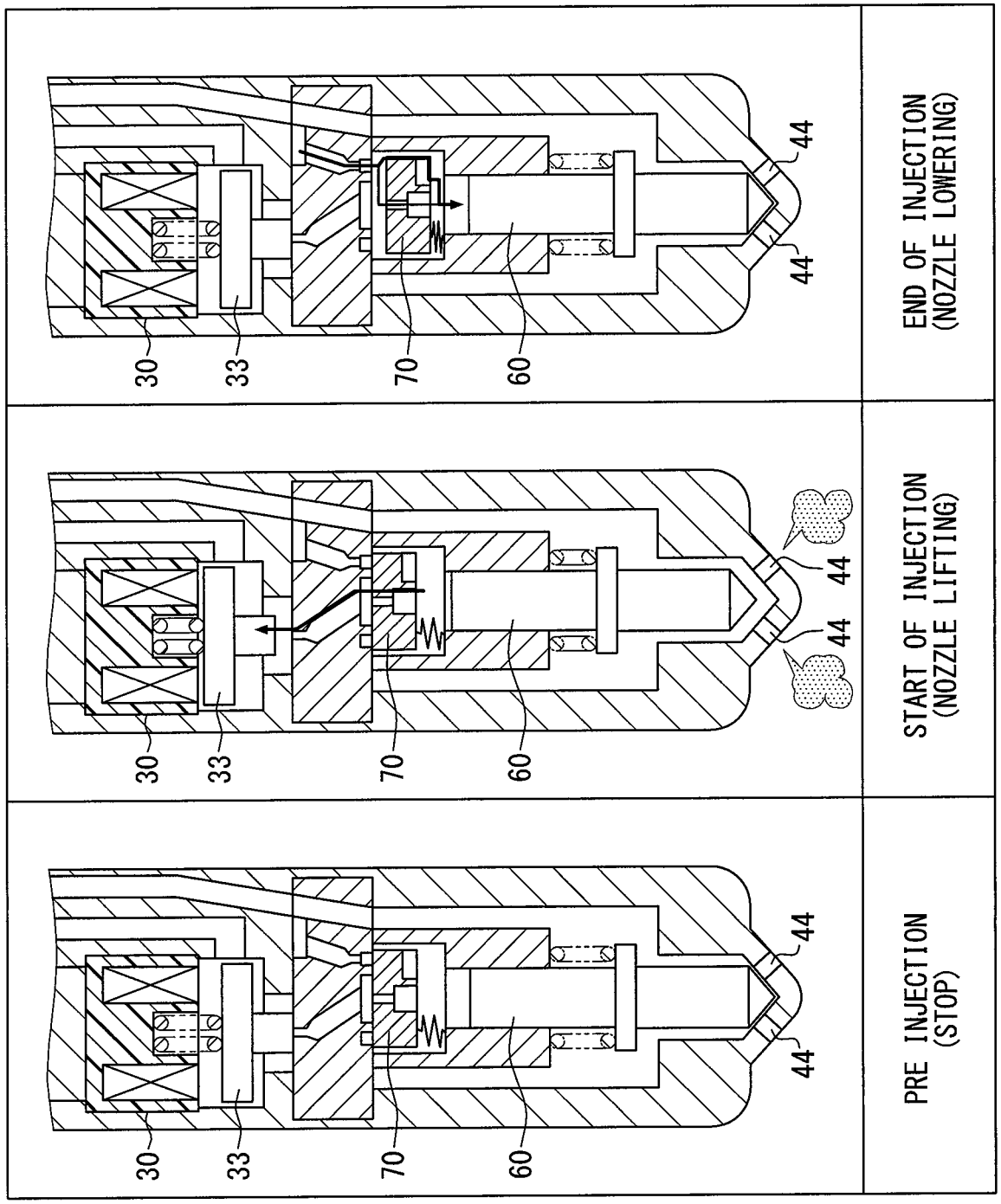
FIG. 3 is a diagram illustrating operation of the fuel injection valve.

Next, with reference to FIG. 3, an operation where the fuel injection valve 600 performs a fuel injection according to a driving current from the ECU 400 will be described. The diving current does not flow through the solenoid 31a before a fuel injection, i.e., during a non-injection period. Thus, the armature 33 is in a closed state, and a pressure of the fuel in the pressure control chamber 53 is maintained to be high. Hence, the nozzle needle 60 is pressed downward by the pressure of the fuel in the pressure control chamber 53, whereby the closed states of the injection holes 44 are maintained.

Next, the operation where fuel injection is started will be described. The ECU 400 executes an opening valve control by supplying a driving current to the solenoid 31a to cause the pressure control valve 35 to open. The outflow passage 52b is brought into fluid communication with the armature chamber 54. Then, the fuel in the pressure chamber 53 flows toward the armature chamber 54 through the out orifice 71 and the outflow passage 52b. As a result, the pressure of the fuel in the pressure control chamber 53 is decreased, and the nozzle needle 60 moves toward the pressure control chamber 53, whereby the injection holes 44 are in the open states. Accordingly, fuel injection is started.

Next, the operation where fuel injection is stopped will be described. When the ECU 400 stops supplying the driving current, the pressure control valve 35 is closed by the spring 31c and the fluid communication between the outflow passage 52b and the armature chamber 54 is shut off. Then, the fuel through the inflow passage 52a flows into the pressure control chamber 52a while pressing the floating plate 70 downward. As a result, the pressure of the fuel in the pressure control chamber 53 is increased again, and the nozzle needle 60 swiftly moves toward the seat portion 45 to close the injection holes 44.

Next, the configuration of the driving portion 30 will be described more detail with reference to the FIGS. 4 to 7. The solenoid 31a includes a coil 81, a stator 82, and a stopper 83. The coil 81 is a cylindrical electromagnet that generates an electromagnetic force attracting the armature 33. The stator 82 is formed of a magnetic material and is disposed inside the coil 81. The stator 82 is magnetized when a current flows through the coil 81. When the coil 81 is energized, an electromagnetic force is generated between the stator 82 and the armature 33. The coil 81 is formed of a coil bobbin made of a synthetic resin and a wire coated with an insulating coating. The wire is wound around the coil bobbin multiple times.

Figure 4:
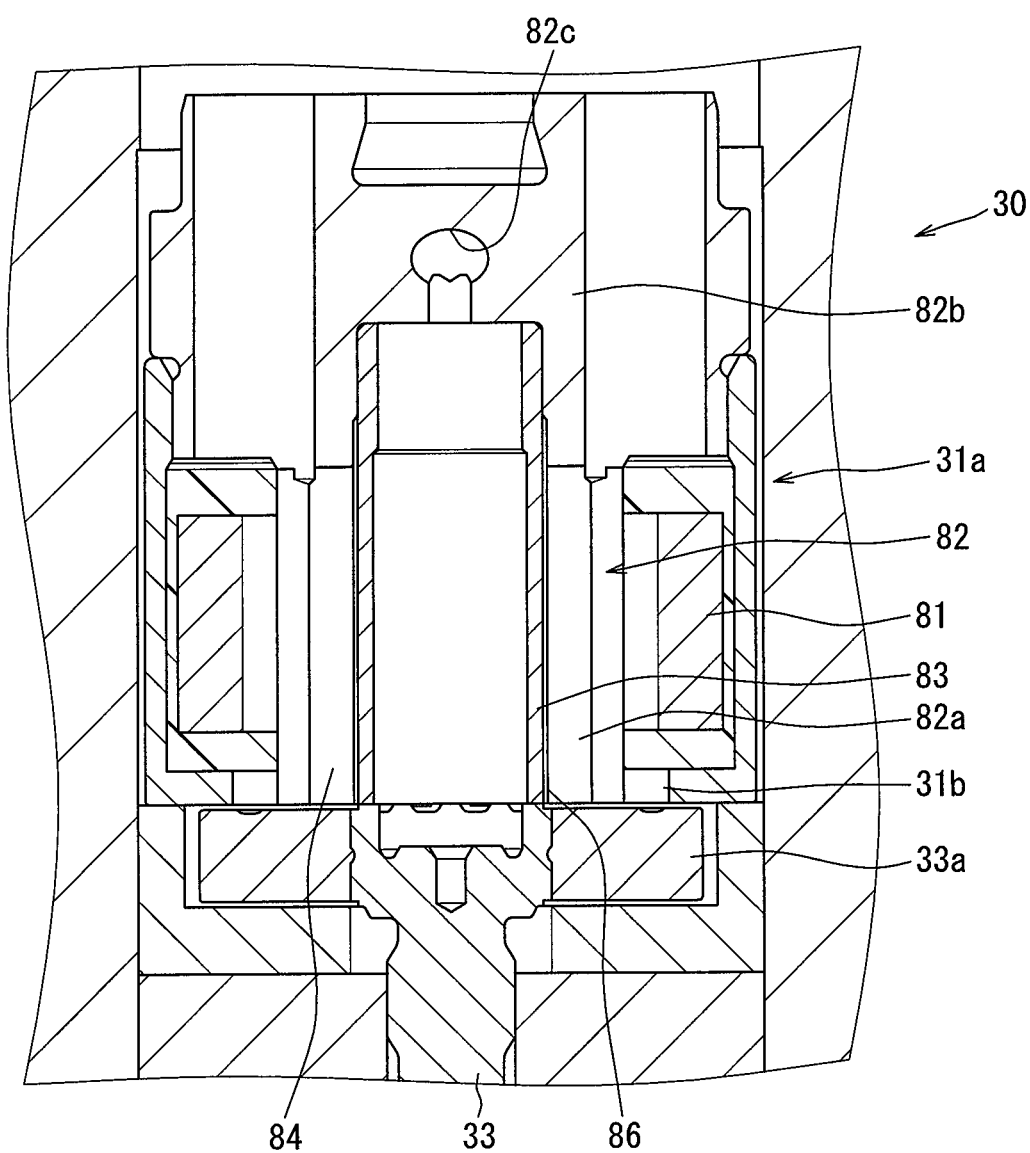
FIG. 4 is a cross-sectional view illustrating a driving portion.
Figure 6:
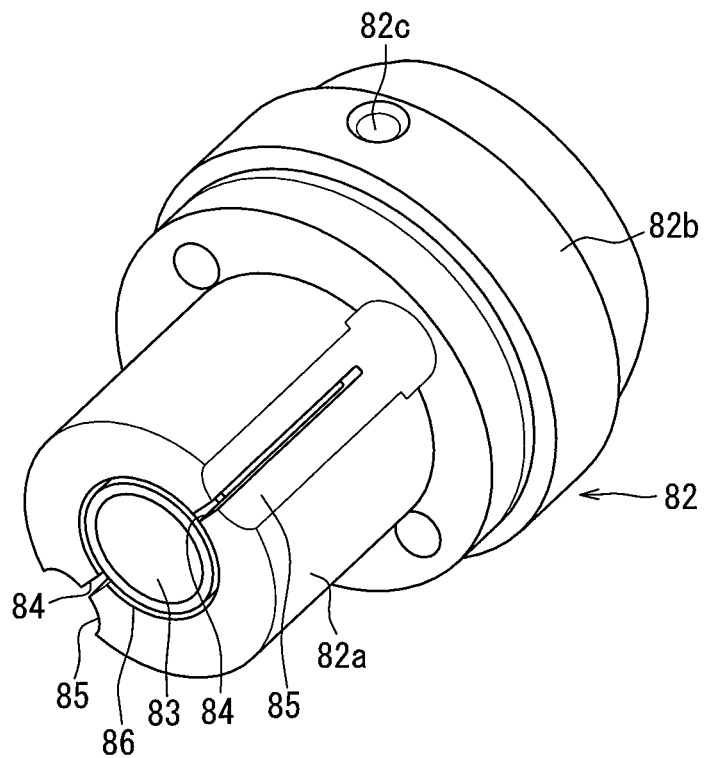
FIG. 6 is a perspective view of the stator.
Figure 7:
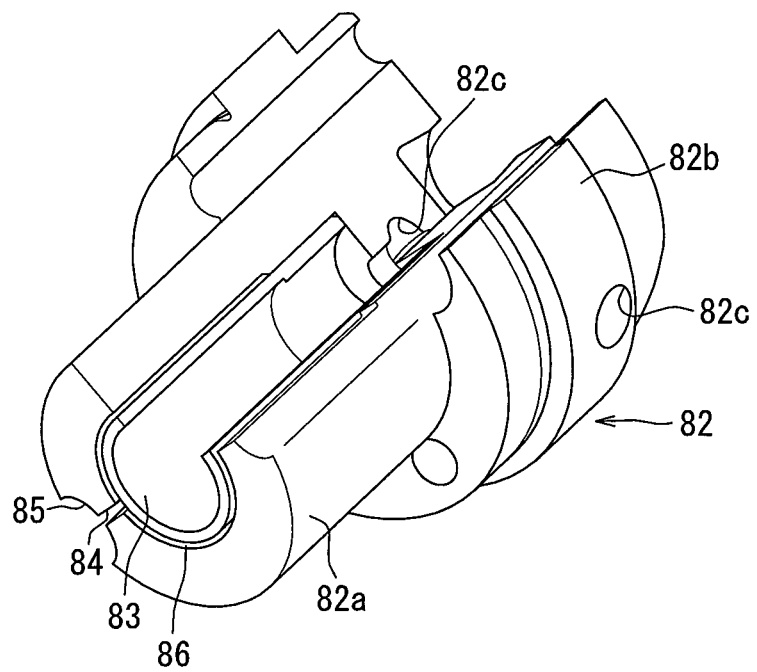
FIG. 7 is a perspective view of the stator where a portion of the stator is omitted for illustration.

The stator 82 includes a cylindrical portion 82a and a columnar portion 82b having a radius greater than the cylindrical portion 82a, as shown in FIGS. 6 and 7. The stator 82 has a two-step columnar shape with the cylindrical portion 82a and the columnar portion 82b that are coaxially arranged with each other. The cylindrical portion 82a defines therein a space to house the stopper 83. The coil 81 is arranged around the cylindrical portion 82a. As shown in FIG. 4 the columnar portion 82b is a portion in contact with the upper surface of the coil 81. The circumferential surface of the columnar portion 82b is fixed inside the holder 48. The columnar portion 82b defines a communication passage 82c through which the inside of the cylindrical portion 82a is in fluid communication with the outside of the cylindrical portion 82a. The inside of the cylindrical portion 82a and the communication passage 82c serve as a portion of the low pressure fuel passage 51b.

As shown in FIG. 6, two slits 84 are formed in the cylindrical portion 82a. The slits 84 pass through a wall of the cylindrical portion 82a in a radial direction, whereby the inside and the outside of the cylindrical portion 82a are in fluid communication with each other. Each of the slits 84 extends toward the columnar portion 82b from an end portion of the cylindrical portion 82a. Each of the two slits 84 is positioned in a particular region of the stator 82 to be opposite to each other in the radial direction of the coil 81. Each of the slits 84 serves as an insulator suppressing a current flowing through the cylindrical portion 82a in a circumferential direction. The slits 84 are not formed in the columnar portion 82b. Therefore, the slits 84 extend to a middle position of the stator 82 in the axial direction, i.e., does not entirely extend over the stator 82 in the axial direction. In other words, the stator 82 is continuously formed entirely along the circumferential direction by the magnetic material. In the present embodiment, the end portion side of the cylindrical portion 82a is not continuously formed along the circumferential direction due to the existence of the slits 84, whereas the base side of the cylindrical portion 82a close to the columnar portion 82b is continuously formed entirely along the circumferential direction. The base side is a region not facing the coil 81 in the radial direction (i.e., the remaining portion of the cylindrical portion 82a other than the particular portion).

Figure 5:
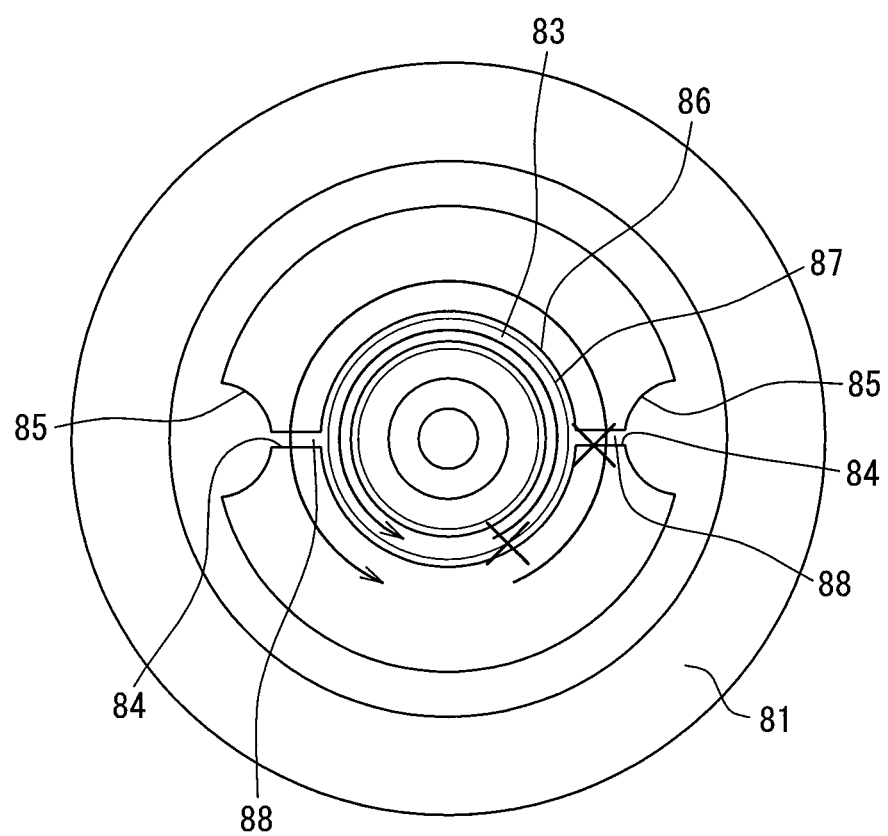
FIG. 5 is a bottom view of a stator.

As shown in FIG. 5, the cylindrical portion 82a includes positioning portions 85 that are recessed in the radial direction and position (lock) the coil 81. The coil 81 includes protrusions having a shape corresponding to the positioning portions 85. The protrusion is engaged with the corresponding positioning portion 85. As a result, the position of the coil 84 relative to the stator 82 is locked. The slits 84 are formed in the positioning portions 85.

The stopper 83 is arranged in the cylindrical portion 82a of the stator 82. The stopper 83 is formed of a non-magnetic steel, such as chromium molybdenum steel. The stopper 83 has a pipe shape having opening ends at both end sides, as shown in FIG. 7. A base portion of the stopper 83 is fixed to the stator 82 by being fit into the stator 82. In the remaining portions other than the base portion of the stopper 83, a clearance 86 is formed between an inner wall of the stator 82 and an outer wall of the stopper 83. The region in which the clearance 86 is formed is a region where the coil 81 faces the stator 82 in the radial direction.

In the driving portion 30, even when the armature 33 reaches the top position, a gap is still ensured between the upper surface of the armature 33 and the lower surface of the stator 82 to prevent occurrence of a response failure due to a residual magnetism after stopping supplying a current to the coil 81. The gap is secured by the stopper 83. Therefore, the stopper 83 regulates the position of the top portion of the armature 33. The spring 31c is disposed inside the stopper 83. The spring 31c biases the armature 33 in a closing direction.

Although not shown in FIG. 4, a clearance resin portion 87 (a second resin portion) made of a resin is disposed in the clearance 86 formed between the stator 82 and the stopper 83, as shown in FIG. 5. The clearance resin portion 87 is formed by inserting a resin into the clearance 86 and then curing the resin in a state where the stopper 83 is fixed to the cylindrical portion 82a.

Similarly, slit resin portions 88 (first resin portions) made of resin are disposed in the slits 84. The slit resin portions 88 are formed by inserting a resin into the slits 84 and then curing the resin in a state where the stator 82 is coupled to the coil 81.

In the present embodiment, the slit resin portions 88 and the clearance resin portion 87 are formed at the same time through the same manufacturing process. Therefore, the slit resin portions 88 and the clearance 86 are connected to each other. Furthermore, as shown in FIG. 5, a space between the stator 82 and the coil 81 is filled with a resin.

Figure 8:
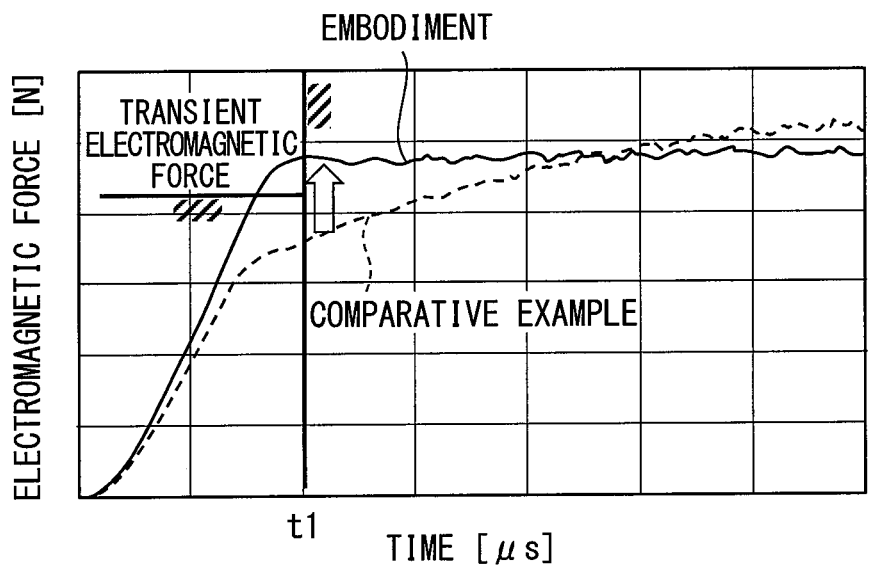
FIG. 8 is a graph of an electromagnetic force.

Next, with reference to FIG. 8, a comparison between an electromagnetic force generated by the present embodiment having the slits 84 and an electromagnetic force generated by a comparative example without the slits 84. As shown in FIG. 8, the electromagnetic force by the present embodiment at a time t1 is greater than the comparative example, and its slope of the present embodiment is also greater than the comparative example. As shown in FIG. 5, occurrence of an eddy current that would flow through the cylindrical portion 82a of the stator 82 can be suppressed by the slits 84, whereby a transient electromagnetic force can be improved. In other words, in the comparative example without the slits 84, an impeding magnetic flux is generated due to an eddy current generated in the cylindrical portion 82a of the stator 82, whereby a transient electromagnetic force is decreased.

Figure 9:
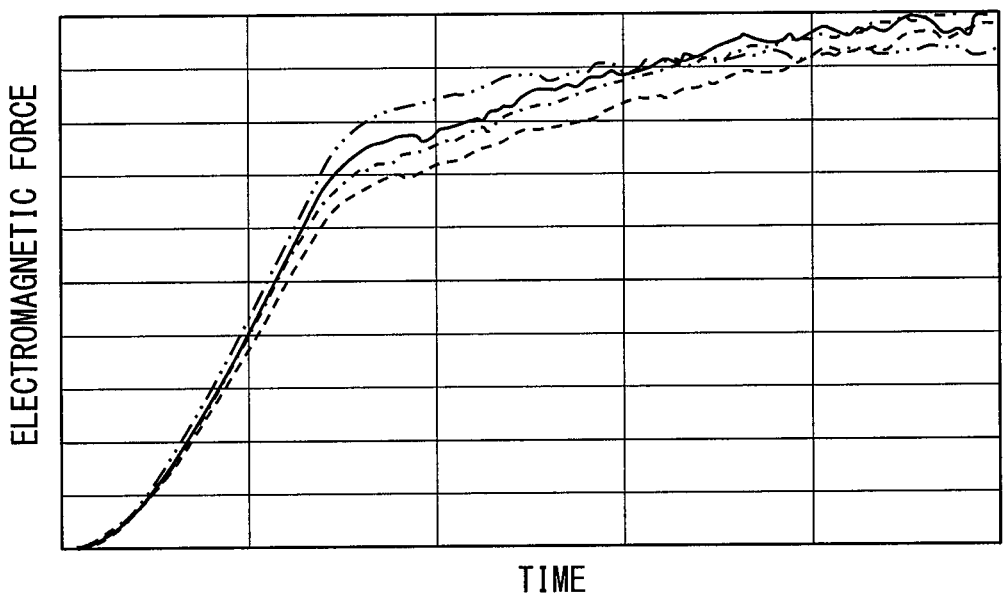
FIG. 9 is a graph of an electromagnetic force.

Next, the relation between the number of the slits 84 and the electromagnetic force will be described with reference to FIG. 9. FIG. 9 shows a comparative example where the stator 82 has no slit 84, a first example with one slit 84, a second example with two silts 84, and a third example with four slits 84. In the third example, the four slits 84 are formed at 90-degree intervals.

As shown in FIG. 9, the transient electromagnetic force increases as the number of the slits 84 increases. In other words, the effect of suppressing occurrence of an eddy current increases as the number of the slits 84 increases. The number of the slits 84 can be determined balancing a necessary electromagnetic force with its manufacturing costs.

When only one slit 84 is formed to face the coil 81 in the radial direction, occurrence of a deformation of the cylindrical portion 82a of the stator 82 can be suppressed during the process of forming the slit 84, in addition to the increase in the electromagnetic force. As a result, a dimensional accuracy of the slit 84 can be improved.

According to the fuel injection valve 600 of the present embodiment, the two slits 84, which function as insulators, are formed partially in a particular region of the stator 82 that faces the coil 81 in the radial direction. By forming the slits 84, an eddy current flowing through the stator 82 can be suppressed. Furthermore, the columnar portion 82b of the stator 82 is continuously formed entirely along the circumferential direction of the columnar portion 82b by the magnetic material. In other words, since the slits 84 do not extend over the entire region of the stator 82 in the axial direction, the stator 82 is not completely split by the slits 84. Thus, when the coil 81 is energized, occurrence of the eddy current in the stator 82 can be suppressed.

As described above, occurrence of the eddy current can be suppressed by the slits 84 in the stator 82. Thus, the driving portion 30 can suppress negative effects due to the impeding magnetic flux due to the eddy current, and thus is able to drive the armature 33 by a magnetic field generated at the coil 81.

In other words, the slits 84 exist only in a region close to the coil 81 where an eddy current is typically generated, i.e., from an end surface of the stator 82 to an upper end of the coil 81, which does not completely divide the stator 82. Therefore, it is possible to form a plurality of the slits 84, thereby improving the eddy current suppression effects and improving the transient electromagnetic force.

In the present embodiment, the slits 84 extend from the end portion of the stator 82 close to the armature 33 and over the entire region of the stator 82 that faces the coil 81. The slits 84 are formed at positions opposite to each other. The region of the stator 82 facing the coil 81 in the radial direction is a region where a magnetic field generates. Thus, it is possible to suppress occurrence of an eddy current in such a region by the slits 84. Further, by forming the slits 84 to be opposite to each other, the cylindrical portion 82a of the stator 82 can be equally, partially split. Therefore, the occurrence of the eddy current can be more effectively suppressed.

In the present embodiment, the clearance 86 is formed between the inner wall of the stator 82 and the outer wall of the stopper 83. Thus, it is possible to inhibit a current from flowing between the stator 82 and the stopper 83. Thus, even when the coil 81 is energized, occurrence of an eddy current between the stator 82 and the stopper 83 can be suppressed.

Furthermore, the slits 84 serving as the insulators are through holes passing through the wall of the stator 82. Therefore, the insulators can be easily formed by forming the slits 84 in a partial region of the stator 82.

Furthermore, since the slits 84 extend in the axial direction, even if the space between the two silts 84 is small, the stator 82 can be surely insulated by the slits 84 in the circumferential direction. Thus, it is possibly to effectively insulate the stator 82 while suppressing a decrease in the volume of the stator 82.

The resin, which serves as an insulator, is filled in the clearance 86 between the stator 82 (the slits 84) and the stopper 83. Thus, it is possible to avoid a situation where foreign substances, such as burrs generated during a manufacturing process, get into the clearance 86 and stay in the clearance 86, and then such foreign substances fall off from the clearance 86 when the armature 33 starts operation and then interfere with the armature 33. Furthermore, it is also possible to avoid a situation where the stator 82 and the stopper 83 are electrically connected to each other by the foreign substances, i.e., an electric circuit is unexpectedly formed, and as a result the eddy current suppression effect is deteriorated.

Furthermore, by using the resin in the stator 82, it is possible to suppress tilting of the stopper 83 due to an external force generated during a manufacturing process. If the stopper 83 is tilted to be in contact with the stator 82, an electric current would be formed in the stator 82 through the stopper 82. As a result, an eddy current would generate and the transient electromagnetic force would be decreased. Furthermore, if the stopper 83 is tilted, an action of the spring 31c in the stopper 83 would be also negatively affected. These negative effects can be avoided by using the resin in the clearance 86.

In the present embodiment, the stator 82 includes the positioning portions 85 that are recessed in the radial direction and position the coil 81. Each of the slits 84 is formed in the corresponding positioning portion 85. Since an area of the lower surface of the stator 82 is reduced due to the existence of the slits 84, an electromagnetic force may be also decreased. Therefore, the reduced area due to the existence of the slits 84 should be necessarily small. In this regards, since each of the positioning portions 85 is formed as a recessed portion, the thickness of the portion of the stator 82 where the positioning portion 85 is formed has the minimum value. Thus, by forming the slit 84 in such a portion, the length of the slit 84 decreases. As a result, it is possible to decrease the reduced area of the stator 82 due to the existence of the slits 84.

Other Embodiments

In the first embodiment, the stopper 83 is disposed inside the stator 82. Alternatively, a portion of the armature 33 may be inserted into the stator 82 to guide the armature 83.

In the first embodiment, the resin is filled into the clearance 86. Alternatively, the stopper 83 may be covered with an insulator layer. Since only an outer circumferential portion of the stopper 83 is coated, process would be more simple as compared to a situation where the stator 82 is entirely coated, whereby it would be advantageous in terms of quality control and costs.

In the first embodiment, the slits 84 serve as the insulators. Alternatively, an insulating material may be used in lieu of the slits 84. For example, the stator 82 may be formed of a composite magnetic material and insulating portions may be formed in the stator 82, partially.

In the first embodiment, the through hole serves as the slit extending along the axial direction. Alternatively, a plurality of through holes, each of which has a circular shape, may be formed to extend in the axial direction. Furthermore, the through holes have an elliptical shape extending along the axial direction.

In the first embodiment, the driving portion 30 of the fuel injection valve 600 serves as the electromagnetic actuator. Alternatively, other devices for driving the armature 33 may serve as the electromagnetic.

What is claimed is:

1. An electromagnetic actuator that drives an armature by an electromagnetic force, the electromagnetic actuator comprising:
    a stator that is formed of a magnetic material and has a cylindrical portion;
    a coil that is disposed outside of the stator, the coil generating a magnetic field when being energized; and
    an insulator that extends partially along the stator in a circumferential direction and suppresses a current flowing through the stator in the circumferential direction, wherein
    the stator includes a portion that is continuously formed entirely along the circumferential direction by the magnetic material,
    the cylindrical portion of the stator is provided with the insulator, and
    the insulator is formed of a slit extending along an axial direction of the cylindrical portion and located in a region of the stator where the stator faces the coil in a radial direction of the cylindrical portion.

2. The electromagnetic actuator according to claim 1, further comprising:
    a stopper that is formed in a pipe shape and is disposed inside the stator, the stopper being brought into contact with the armature when the armature is moved; and
    a spring that is disposed inside the stopper, the spring biasing the armature, wherein
    a clearance is defined between an inner wall of the stator and an outer wall of the stopper in the region where the coil faces the stator.

3. The electromagnetic actuator according to claim 1, wherein the slit passes through a wall of the stator.

4. The electromagnetic actuator according to claim 3, further comprising
    a first resin portion that is made of a resin and is located in the slit.

5. The electromagnetic actuator according to claim 2, further comprising a second resin portion that is formed of a resin and is disposed in the clearance.

6. The electromagnetic actuator according to claim 3, wherein
    the stator includes an end portion facing the armature,
    the cylindrical portion is provided with at least two slits including the slit, and the at least two slits each extends along the axial direction over the region and face each other in the radial direction.

7. The electromagnetic actuator according to claim 3, wherein the stator has a positioning portion that is recessed from an outer surface of the cylindrical portion in the radial direction, the positioning portion configured to position the coil, and the slit is formed in the positioning portion.

8. An electromagnetic actuator that drives an armature by an electromagnetic force, the electromagnetic actuator comprising:

a stator;

a coil located outside of the stator and generating a magnetic field when being energized; and an insulator suppressing a current flowing through the stator along a circumferential direction of the stator, wherein the stator includes:
  a first portion facing the coil in a radial direction of the stator and provided with the insulator; and
  a second portion located adjacent to the first portion in an axial direction of the stator, located outside of the coil along the axial direction, and continuously formed entirely along the circumferential direction, and the insulator is formed of a slit extending along the axial direction.

9. The electromagnetic actuator according to claim 8, wherein the slit extends from a distal end of the first portion toward the second portion along the axial direction.

10. The electromagnetic actuator according to claim 9, wherein the first portion has a hollow cylindrical shape, and the slit passes through the first portion in the radial direction.

* * * * *